(12) United States Patent
Cady

(10) Patent No.: US 7,223,054 B1
(45) Date of Patent: May 29, 2007

(54) SPIRAL GROOVE PIPE JOINT MACHINING ASSEMBLY

(76) Inventor: Gregory Dale Cady, P.O. Box 190, Siloam Springs, AR (US) 72761

( * ) Notice: Subject to any disclaimer, the term of this patent is extended or adjusted under 35 U.S.C. 154(b) by 0 days.

(21) Appl. No.: 11/349,736

(22) Filed: Feb. 8, 2006

Related U.S. Application Data

(63) Continuation-in-part of application No. 10/454,339, filed on Jun. 4, 2003, now abandoned.

(60) Provisional application No. 60/431,511, filed on Dec. 6, 2002.

(51) Int. Cl.
*B23B 23/02* (2006.01)

(52) U.S. Cl. .......... 409/143; 409/76; 408/31; 408/221; 82/113; 82/110

(58) Field of Classification Search ............ 30/107, 30/108, 92, 93, 94, 95, 96, 97, 98, 99, 100, 30/101, 102, 103, 104, 105, 106; 408/31, 408/221, 38, 142; 409/65, 66, 67, 68, 69, 409/70, 71, 72, 73, 74, 75, 76, 138, 139, 409/140, 143, 259, 260, 261; 82/113, 110; 29/33 T, 33 D
See application file for complete search history.

(56) References Cited

U.S. PATENT DOCUMENTS

| | | | |
|---|---|---|---|
| 2,849,926 A | 9/1958 | Burgsmuller | 90/11.64 |
| 3,545,018 A | 12/1970 | Peterson | 10/101 |
| 3,699,828 A | 10/1972 | Piatek et al. | 82/4 |
| 4,066,380 A | 1/1978 | Beck et al. | 408/125 |
| 4,186,631 A | 2/1980 | Grider | 82/5 |
| 4,250,775 A | 2/1981 | Jerue et al. | 82/1 |
| 4,643,057 A | 2/1987 | Hall et al. | 82/36 |
| 4,730,373 A | 3/1988 | Senoh | 29/26 |
| 4,758,121 A | 7/1988 | Kwech | 409/185 |
| 4,770,074 A | 9/1988 | Kwech | 82/4 |
| 6,086,297 A | 7/2000 | Lotfi | 409/184 |
| 6,276,244 B1 | 8/2001 | Fisher et al. | 82/113 |
| 6,345,939 B1 | 2/2002 | Poeting | 408/38 |
| 2001/0001935 A1 | 5/2001 | Wilk, Jr. et al. | 82/113 |

*Primary Examiner*—Dana Ross
(74) *Attorney, Agent, or Firm*—Keisling Pieper & Scott PLC; David B. Pieper; Meredith K. Lowery

(57) ABSTRACT

A spiral spline groove machine apparatus for manufacturing a sealed spiral spline pipe connection by machining spiral grooves into the bell and spigot end of a length of pipe. A rotating cutter is adapted to cut a spiral groove in the inside of the bell of the pipe or machine the recessed external groove on the male end of the pipe. The cutter is adapted to float on the surface contour of the pipe to allow for variations in the wall thickness of the pipe and provide a consistent depth for the cut in the wall of the pipe without regard to the symmetry of the circular cross section of the pipe. An exit port machining device is also disclose to cut an exit port connected to the inside spiral groove on the bell end of the pipe. Another unique aspect of the invention is the use of a rotational to linear converter using a lead screw to move an entire rotating assembly having the motor output fixed directly to the cutter without an expansion joint.

7 Claims, 11 Drawing Sheets

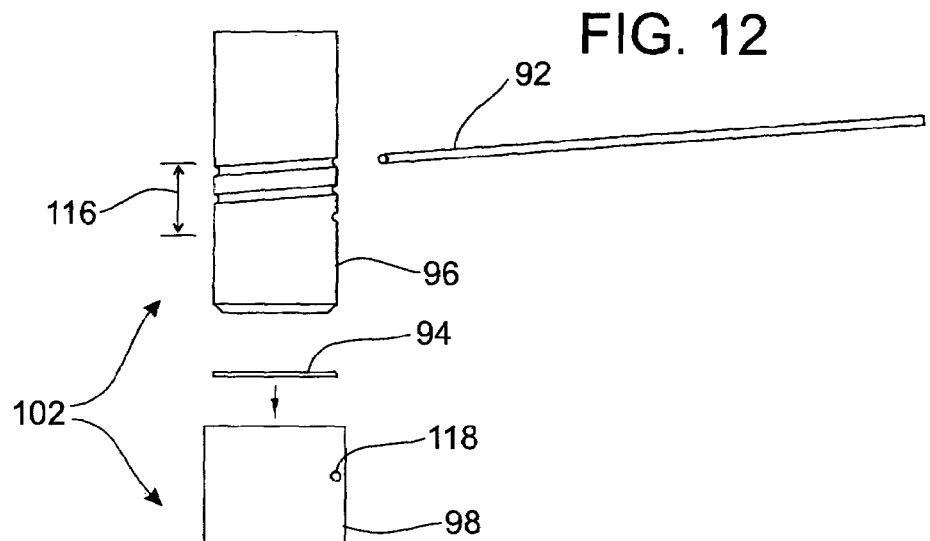
FIG. 12
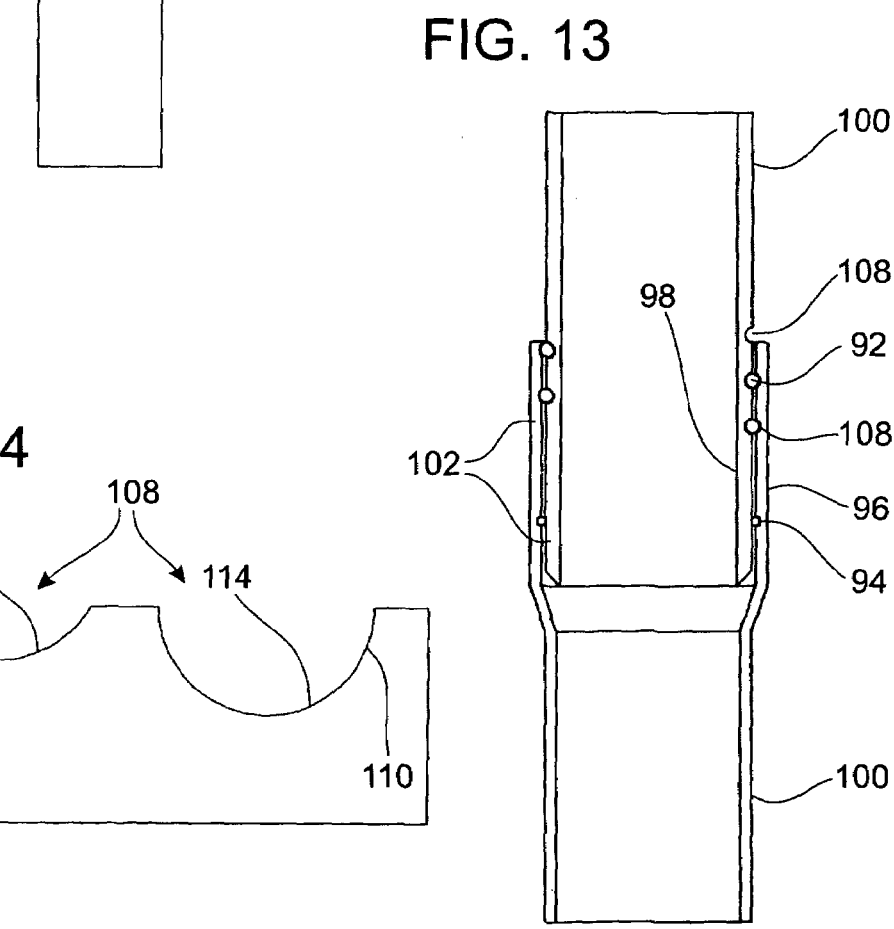
FIG. 13
FIG. 14

SPIRAL GROOVE PIPE JOINT MACHINING ASSEMBLY

CROSS-REFERENCE TO RELATED APPLICATIONS

This application hereby claims priority to and is a continuation-in-part of application Ser. No. 10/454,339, filed Jun. 4, 2003 now abandoned which claims priority to and is a continuation-in-part of U.S. provisional application Ser. No. 60/431,511, filed on Dec. 6, 2002, which are hereby incorporated by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Field of the Invention

The present invention relates to the field of machines for forming pipe joints in general. In particular, the present invention relates specifically to an apparatus and method for forming a spiral spline groove and exit port for a locking threaded pipe joint. The invention comprises a custom machine tool for manufacturing a sealed spiral connection by machining the bell and spigot end of a length of pipe. The rotating cutter is adapted to cut a recessed spiral groove and exit port in the inside of the bell of the pipe or machine the external groove on the male end of the pipe. The cutter is adapted to float on the surface contour of a pipe to allow for variations in the shape and wall thickness of the pipe. This provides for a consistent depth for the cut in the wall of the pipe without regard to the symmetry or consistency of the circular cross section of the pipe. Another unique aspect of the invention is the use of a lead screw to move an assembly having the motor fixed directly to the cutter without an expansion joint.

2. Description of the Known Art

As will be appreciated by those skilled in the art, a circular spline may be used to join sections of pipe. Details of a typical flat circular groove are known in the prior art, but the use of a spiral spline and exit port and the machines for forming them are not known for pipe joints.

Consideration should be given to Class 82, Turnings which includes subject matter relating to includes severing or cutting (off and/or out) of work of predetermined section (and/or size) by cutting movement(s) of tool and work including (1) relative rotation of either or both about an axis passing through the work and (2) relative translation of either or both substantially normal or parallel to said axis during cutting. Subclasses to be considered in Class 82 include: Subclass 1.2 which is directed to apparatus or process including a rotating assemblage which is adapted to sever portions from the inside of a hole in material by a cutting means which is moving radially relative to the axis of rotation of the assemblage while simultaneously turning about that axis; Subclass 1.3 which is directed to apparatus or process for forming or finishing a noncircular (e.g., elliptical, square) hole; Subclass 110 which is directed to lathes specially adapted for removing material from an externally threaded fastener; and Subclass 113 which is directed to a lathe which is readily transportable or movable and which is specially designed for rotating and cutting hollow cylindrical work generally used for conveying fluids.

Examples of these technologies are provided in the following patents and published applications as a basis in these technologies to understand the present invention: U.S. Pat. No. 2,849,926, issued to Burgsmuller on Sep. 2, 1958; U.S. Pat. No. 3,545,018, issued to Peterson on Dec. 8, 1970; U.S. Pat. No. 3,699,828, issued to Piatek et al. on Oct. 24, 1972; U.S. Pat. No. 4,066,380, issued to Beck et al. on Jan. 3, 1978; U.S. Pat. No. 4,186,631, issued to Grider on Feb. 5, 1980; U.S. Pat. No. 4,250,775, issued to Jerue et al. on Feb. 17, 1981; U.S. Pat. No. 4,643,057, issued to Hall et al. on Feb. 17, 1987; U.S. Pat. No. 4,758,121, issued to Kwech on Jul. 19, 1988; U.S. Pat. No. 4,770,074, issued to Kwech on Sep. 13, 1988; U.S. Pat. No. 6,086,297, issued to Lotfi on Jul. 11, 2000; U.S. Pat. No. 6,276,244, issued to Fisher et al. on Aug. 21, 2001; and U.S. Patent Application Pub. No. US 2001/0001935 filed by Wilk, Jr. et al. with a Pub. Date of May 31, 2001.

U.S. Pat. No. 2,849,926 issued to Burgsmuller on Sep. 2, 1958 discloses a thread cutting device. This patent describes the use of a lathe for spinning a work piece 23 and operating a drive screw (not numbered) for moving a carriage 3 holding a cutting tool 8 driven by a motor 13. The unique aspect of this patent is the oscillation of the cutting tool to provide for increased cooling time by reducing the amount of cuts taken by the cutting tool on each rotation. The eccentric placement of the cutting tool in relation to the work piece allows for the cutting of a perfectly cylindrical thread across the interior of the work piece.

U.S. Pat. No. 3,545,018 issued to Peterson on Dec. 8, 1970 discloses a method and apparatus for cutting multiple threads in large work pieces. This patent shows the utilization of a cutter head 18 which includes a thread cutting tool 54 operated by hydraulic motor 50. The movement of the cutter head into the central bore of the work piece is controlled by a lead screw driven by a worm nut connected to a stationary motor.

U.S. Pat. No. 3,699,828 issued to Piatek et al. on Oct. 24, 1972 discloses a pipe groover. This patent describes the use of guide rollers 23 which are spring loaded to cooperate with support rollers 22 to accommodate any unevenness in the wall of a pipe being machined. The rollers 22 are locked into position by locking nuts 97 which fixably position the pipe in relation to the cutting head.

U.S. Pat. No. 4,758,121 issued to Kwech on Jul. 19, 1988 describes a boring machine. This patent describes the use of an internal self-centering chuck 10 for positioning a tool head 14 off the central axis of a pipe. Rotational movement of the tool head is performed through hydraulic motors mounted within the self-centering chuck 10. Axial movement of the tool cutting head is provided by a servomotor mounted within the rotatable drive shaft 12.

U.S. Pat. No. 6,086,297 issued to Lotfi on Jul. 11, 2000 describes an apparatus for forming grooves in bell-shaped pipes. This patent describes the use of cutters 97 for forming grooves of a uniform depth on the interior wall of a bell-shaped portion of a pipe. The device also uses a groove depth limiting means which is attached to a strain gauge or other force sensing means for controlling the cutting depth of the cutters in accordance with the face of the interior wall of the pipe.

Each of these patents and the published application are hereby expressly incorporated by reference in their entirety.

These prior art patents fail to recognize the problems with their designs for cutting a circular cross planar groove substantially or completely around the wall of a pipe. This cross planar groove greatly weakens the pipe in the groove area and results in failure points when the pipe is hung by the joint in applications such as well casings. Additional problems are encountered because several of the prior art pipes may rotate in relation to each other even when the joint is completed. Thus, it may be seen that these prior art patents are very limited in their teaching and utilization. A spiral spline groove and exit port machining apparatus is needed to overcome these limitations to build the parts for constructing a spiral spline pipe joint with improved cross sectional strength of the pipe and reduced twisting of the assembled joint.

SUMMARY OF THE INVENTION

The present invention is directed to a spiral spline pipe groove forming apparatus for machining an end of a first plastic pipe having surface contour inconsistencies. In accordance with one exemplary embodiment of the present invention, the spiral spline groove forming apparatus uses a base for supporting a releasable pipe clamp that holds the end of the pipe. The clamp holds either the outside end of the pipe for machining inside the bell housing, or holds a portion of the pipe distal from the end to allow for machining the outside surface of the male end of the pipe. The spiral spline groove, having an associated groove depth and groove distance, is machined into the end of the pipe by a spiral groove machining assembly that is also supported by the base. The groove machining assembly includes a machining extension that is fixed to a surface tracker that may be used to follow the irregular surface contours of a plastic pipe to control the groove depth of the spiral spline groove. By using a spiral spline and following the contours of the surface of the pipe, consistency of the groove and the integrity of the pipe is maintained through the pipe joint.

In one embodiment, the pipe clamp is designed to hold the bell of a pipe where the pipe clamp has a clamp depth equal to the distance of the spiral spline groove along the end of the pipe. In this manner, the pipe clamp can support the pipe during the machining operation along the entire distance of the spiral spline groove.

In another embodiment, the releasable pipe clamp is constructed using a first clamp jaw that includes at least one movable shell adapted to fit the plastic pipe. The movable shell is positioned by a clamp frame. The movement of the shell is controlled by a shell drive that is adapted to clamp and release the shell against the end of the pipe.

Consistency in forming the pipe joints is enhanced in another embodiment by utilizing an end stop connected to the first clamp jaw that provides a stop for repetitive positioning of the end of the pipe.

Yet a further advantage is found in the ability to change out the size of the jaws and reposition the machine assembly for use with different sizes of pipes. One aspect of this ability is found in a jaw interchange assembly adapted to releasably engage different clamp jaws for different sizes of pipes.

Unique aspects of the spiral groove machining assembly also include the use of a rotational assembly base adapted to provide a pivot support and biasing spring to pivotally bias the machining extension. A machining head having a rotational cutter is mounted to the machining extension and this is used in combination with an adjustable groove depth positioning extension that can control the diameter of the cut for the spiral spline groove. This is done by biasing the machining extension against the adjustable groove depth positioning extension. The contact point between the machining extension and the positioning extension may be controlled by using a slide base connected to the machining extension. The spring and pivot bias the slide base against an adjustable slide ramp connected to a linear slide actuator mounted on a slide arm base. The slide arm base is supported off of the rotational assembly base. By controlling the contact point of the machining extension against the adjustable groove depth positioning extension, the machining extension may be selectively positioned against the pipe. If fully extended, then the surface tracker may be used to contact the surface contour of the pipe. One advantage of this control is that an initial cut can be made without using the surface tracker. This forms a reduced groove depth pass to ease the burden placed on the cutter. A subsequent full groove depth pass can then be made using the surface tracker positioned against the surface contours of the pipe to follow the surface irregularities.

Another advantage of the present invention is found in an embodiment of the spiral spline pipe groove forming apparatus which uses an exit port machining assembly supported by the base that is adapted to form an exit port extending from the spiral groove. The exit port machining assembly is mounted on the side of the clamp and is aligned to access the bell of the pipe through a cutting access defined in the releasable pipe clamp.

The exit port machining assembly uses a rotational drive for powering a rotational cutting head. The rotational cutting head is extended and retracted by a head displacement drive. In order to ensure that the exit port aligns with the spiral spline groove for different sizes of pipes, a port depth adjustment device is used to control the depth of the cut for the exit port. A further adjustment is provided by a diameter adjustment device adapted to align the rotational cutting head with the spiral spline groove. In the preferred embodiment, the rotational cutting head is aligned to form an exit port tangent to the spiral spline groove.

Yet a further embodiment of the present invention teaches a unique drive for the assembly that uses a rotational linear displacement drive. Instead of using an expandable drive shaft, the rotational linear drive is fixed to the spiral groove machining assembly. The rotational linear displacement drive includes a rotational movement source and linear movement is provided converting this rotational movement into a linear movement with a fixed rotational-to-linear converter. The rotational-to-linear converter is a threaded rod passing through a fixed position ball joint type of bearing. This system is unique because the rotational motor is mounted on a slide bearing connected to the base so that the rotational motor is linearly fixed to the cutting head and moves with the linear motion of the cutting head. The preferred embodiment also a reduction gear box connected between the rotational movement source and the rotational-to-linear converter for lower revolutions of the output shaft from a conventional motor.

Finally, another unique aspect is provided by controlling tool chatter by using a substantive diameter bearing support connected to the base and adapted to support the machining extension during both rotational and linear displacement of the machining extension. The substantive diameter bearing provides enhanced support and increased control for the machining extension to keep tool chatter to a minimum while allowing easy change out of different machining extensions for different sizes of pipes.

These and other objects and advantages of the present invention, along with features of novelty appurtenant thereto, will appear or become apparent by reviewing the following detailed description of the invention.

BRIEF DESCRIPTION OF THE SEVERAL VIEWS OF THE DRAWINGS

In the following drawings, which form a part of the specification and which are to be construed in conjunction therewith, and in which like reference numerals have been employed throughout wherever possible to indicate like parts in the various views:

FIG. 12 is an exploded side view of a spiral spline pipe joint.

FIG. 13 is a cutaway view of an assembled spiral spline pipe joint.

FIG. 14 is an exemplary view of the different depths achievable for the spline groove.

DETAILED DESCRIPTION OF THE INVENTION

Figure 10:
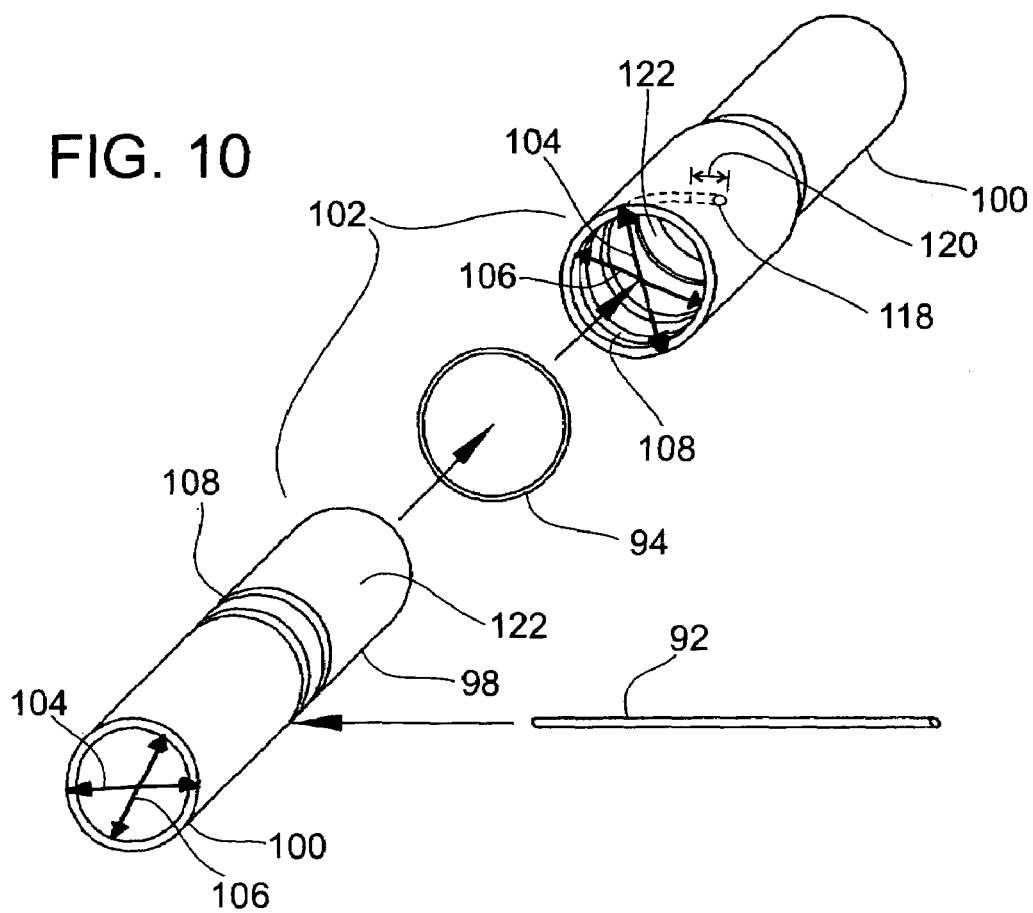
FIG. 10 is an exploded perspective view of a spiral spline pipe joint.
Figure 11:
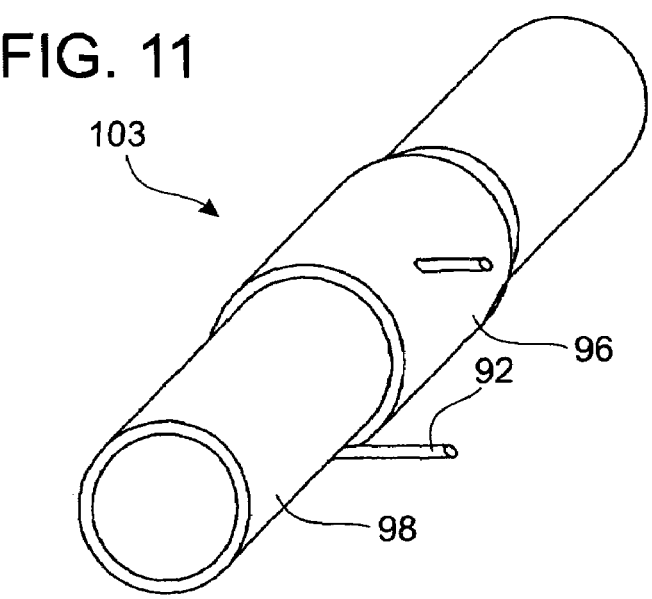
FIG. 11 is an assembled perspective view of a spiral spline pipe joint.

The present invention is a spiral spline pipe groove forming apparatus 126 designed for forming the ends of a spiral spline pipe joint 103 shown in FIG. 10. A short explanation of this spiral spline joint 103 is provided as a basis for understanding the spiral spline pipe groove forming apparatus 126 of the present invention.

FIGS. 10 through 13 show the parts and assembly for joining the male and female ends 102 of plastic pipes 100 to form a spiral spline pipe joint 103. First, a gasket 94 is inserted into the bell 96 of the joint 103. Then the male cylinder 98 is inserted into the bell 96 until it reaches the gasket 94. Note the untouched gasket seat and recessed nature of the groove 108 on the male cylinder 98. The bell 96 and the male cylinder 98 are then rotated until the groove 108 on the exterior of the male cylinder 98 aligns with the groove 108 on the interior of the bell 96. A spline 92 is then inserted into the aligned grooves 108. The spiral spline 92 and groove 108 combination forms a thread connecting the male cylinder 98 and the bell 96. The male cylinder 98 may then use the thread to screw into the bell 96 to overcome the gasket 94 pressure. The male cylinder 98 is inserted until the groove 108 on the male cylinder 98 reaches the inside of the exit port 118. The spline 92 may then be further inserted into the aligned grooves 108 until the spline 92 extends out of the exit port 118. The extension of the spline 92 out of the exit port 118 will work with the end of the groove on the male part of the pipe joint to lock the pipes 100 together.

As noted in FIGS. 10 through 13, grooves 108 and an exit port 118 are formed in the ends 102 of the pipe 100. Each plastic pipe 100 has a male or female end 102 having an external diameter 104 and an internal diameter 106. Each end 102 has a spiral spline groove 108 formed in either the internal or external surface contours 122. While the surface contours 122 generally seem smooth on the polyvinylchloride pipe used in this type of pipe joint 103, these surface contours 122 have raised and lowered portion and are not uniform around the axis of the pipe. These irregularities in the surface contours 122 cause problems when machining the pipe 100 to form the ends 102 for the joint 103. For example, a perfect cylindrical cut in a non-cylindrical surface causes both inadequate depth and excessive depth problems for the cut and may lead to assembly problems or failure of the pipe joint 103. The spiral spline groove 108 has a groove depth 110 that needs to be consistent so that the spline 92 may be inserted and securely hold the pipe joint 103 without excessive play. Thus, it becomes critical to have proper depth 110 regardless of the surface contours 122. Note that the spline groove has an axial groove distance 116 defined by the length of the groove 108, the pitch of the groove 108 and the associated diameter 104, 106 of the pipe 100. Further note that the groove 108 must be recessed on the male cylinder 96 to provide a gasket seat for a sealed joint 103. In addition to the groove 108, a bell 98 of a pipe joint 103 will have an exit port 118 machined in connection with the groove 108 to exit and catch the end of the spline 92. The exit port 118 has a port depth 120 which is shown in its preferred embodiment as passing all the way through the bell 98 to the outside diameter 104 of the bell 98.

Figure 1:
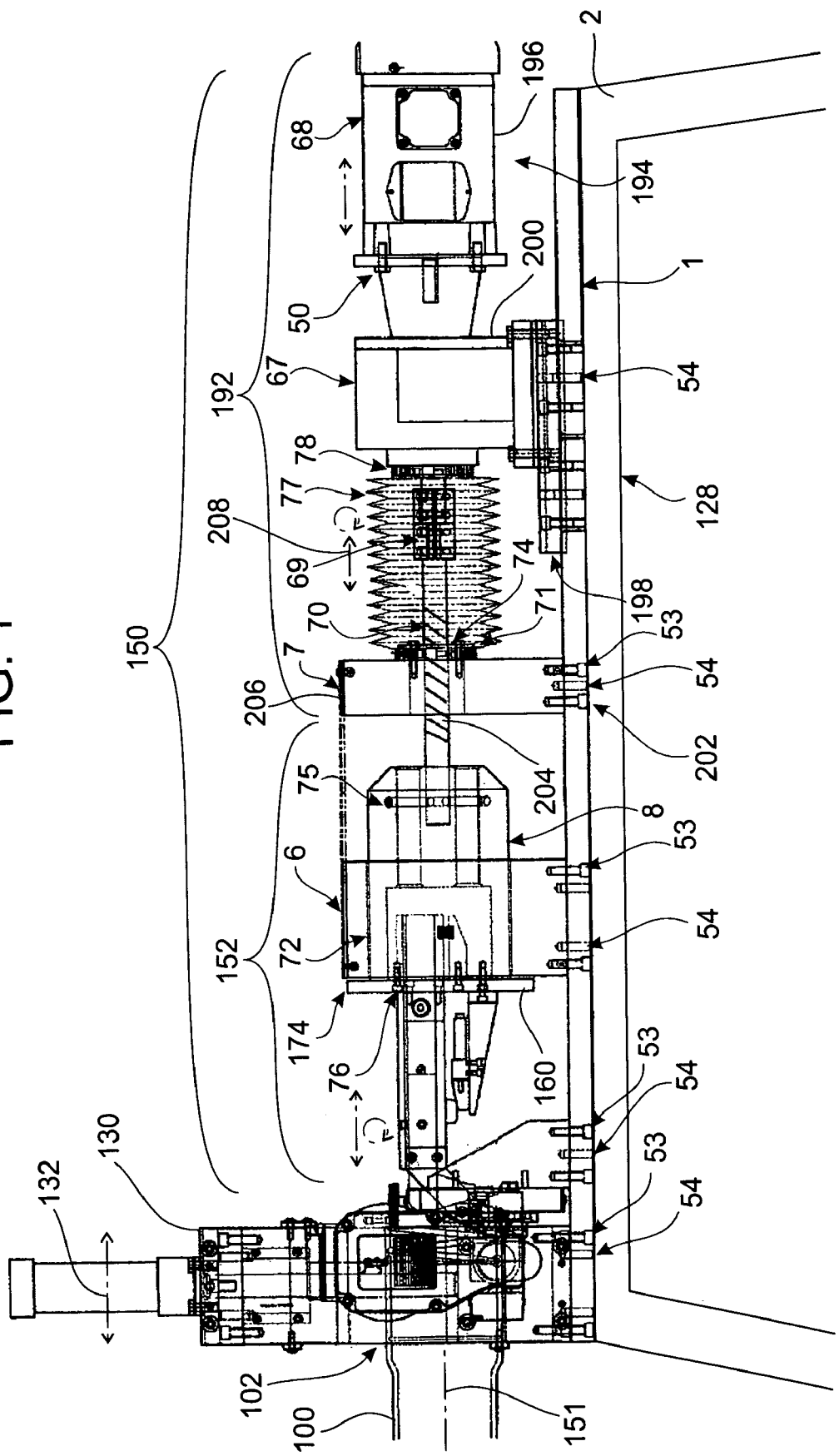
FIG. 1 is a side view of an exemplary embodiment of the spiral groove and exit port forming apparatus.
Figure 2:
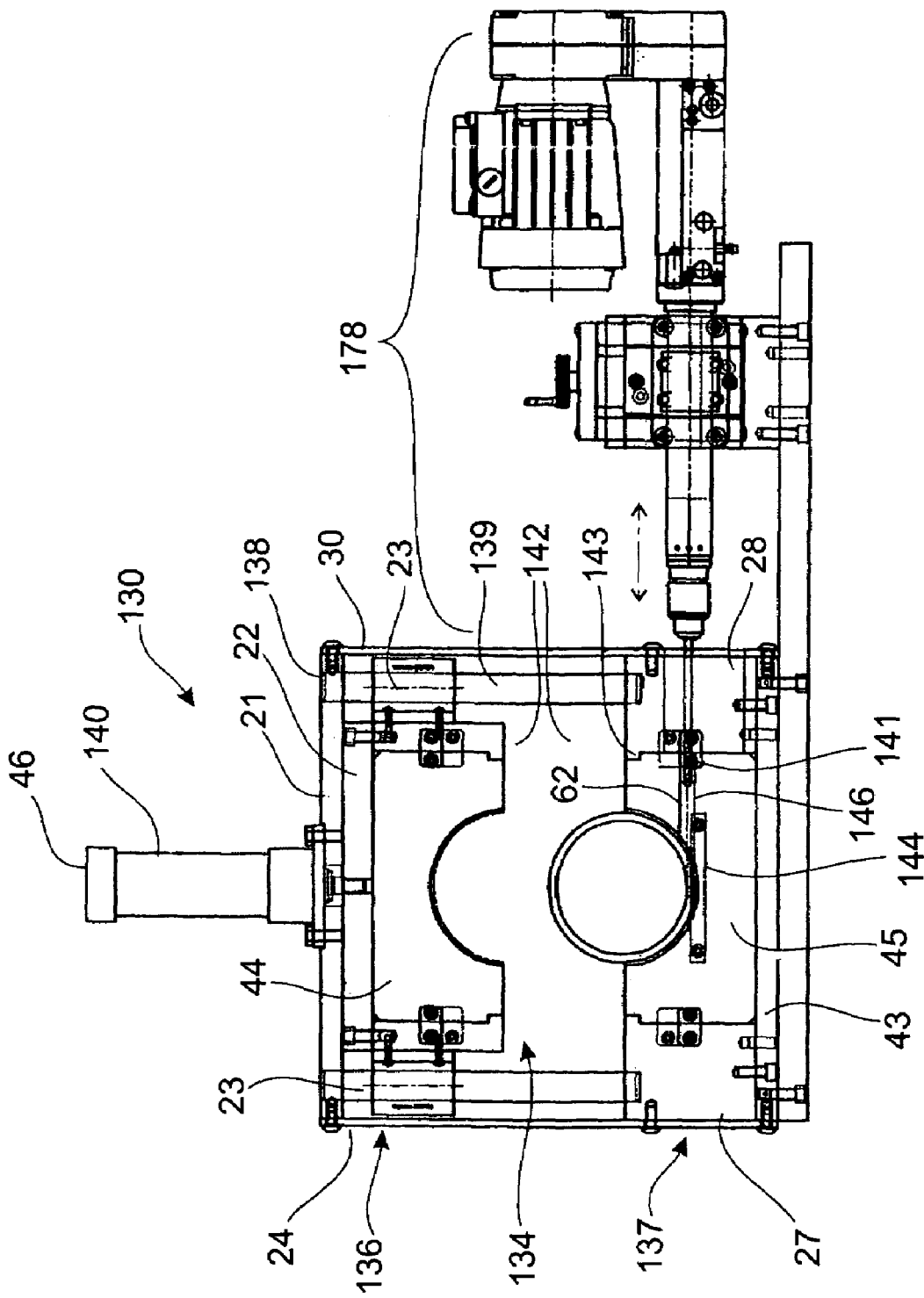
FIG. 2 is a clamp end view of an exemplary embodiment of the spiral groove and exit port forming apparatus.
Figure 3:
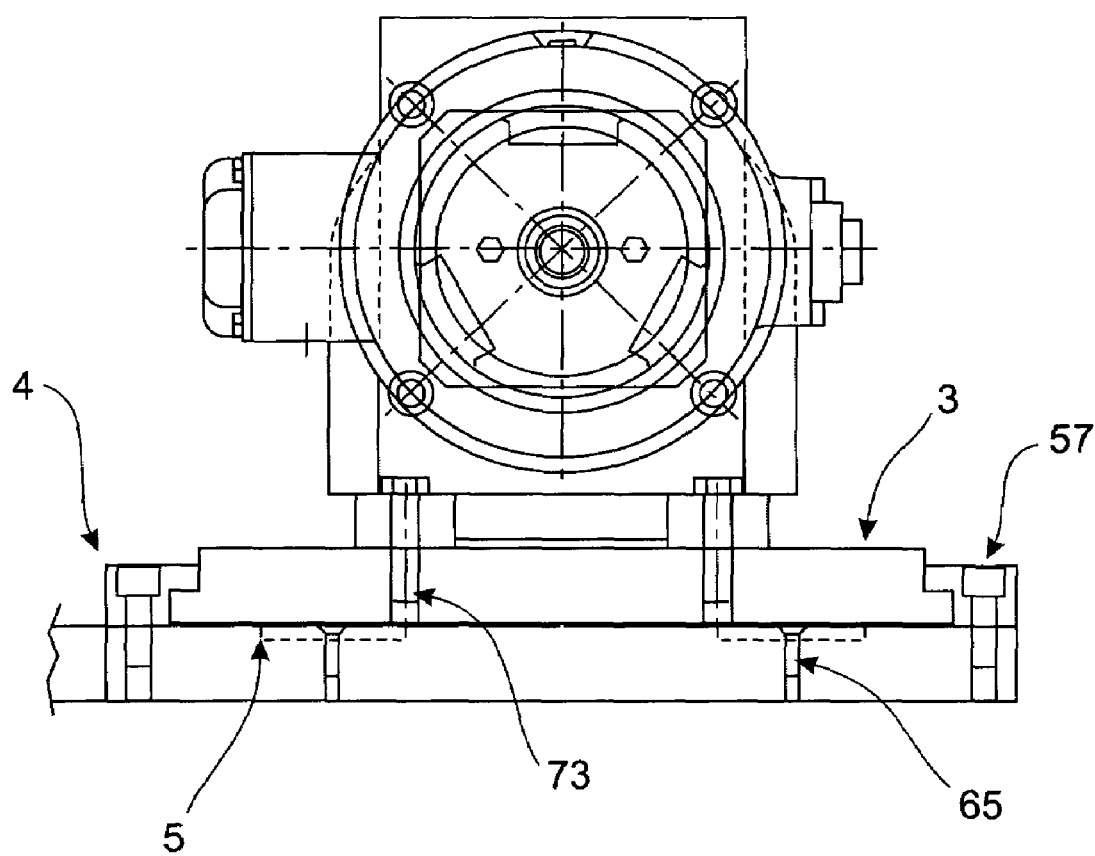
FIG. 3 is a displacement drive end view of an exemplary embodiment of the spiral groove and exit port forming apparatus.

FIG. 1 is a side view of an exemplary embodiment of the spiral groove and exit port forming apparatus 126 of the present invention. FIG. 2 provides a clamp end view, and FIG. 3 is a displacement drive end view of the spiral groove and exit port forming apparatus 126.

The spiral spline pipe groove forming apparatus 126 is mounted on a support base 128 including a base plate 1 mounted on a base plate frame weldment 2. Each of the devices are secured to the base plate 1 using socket head cap screws 53 and dowel pins 54.

The spiral spline pipe groove forming apparatus 126 includes a releasable pipe clamp 130, a spiral groove machining assembly 150 using a machining extension 152 powered by rotational linear displacement drive 192, and an exit port machining assembly 178. The releasable pipe clamp 130 is used to hold either the bell or cylindrical ends 102 of pipes 100 for machining. The spiral groove machining assembly 150 rotates around an axis 151 to cut either the interior or exterior surface of the end 102 of the pipe 100. The rotational linear displacement drive 192 has an output shaft fixed to the spiral groove machining assembly 150 and uses a rotational motor to create both the rotational movement of the machining assembly 150 around the pipe axis 151 and the linear movement along the pipe axis 151 to create the spiral groove 108. Finally, the exit port machining assembly 178 is used to drill the exit hole 118 into the pipe bell 96 so that the exit port 118 aligns with the spiral groove 108 on the inside of the bell 96.

As shown in FIGS. 1 and 2, the releasable pipe clamp 130 has a clamp frame 138 mounted on the base 128. The clamp frame 138 is constructed from a clamp frame top plate 21, left hand clamp frame side plate 29, right hand clamp frame side plate 30, and clamp frame lower plate 43. Mounted inside the clamp frame 138 is a clamp jaw 134 formed from a movable shell 136 mounted over a fixed shell 137. Different sizes of clamp jaws 134 may be used for clamping different sizes of pipes 100 including differences in the pipe bell 98 and the cylindrical end 96 of the pipe. The a movable shell 136 and fixed shell 137 are constructed as part of a jaw interchange assembly 142 using cross over plates 141 and L-shaped shoulders 143 to hold the shells 136, 137 in position and allow for easy change out from one size of clamp jaws 134 to another.

The moveable shell 136 is constructed from an upper clamp block 44 mounted to an upper clamp plate 22 and supported by upper clamp side blocks 23. The moveable shell 136 uses the upper clamp side blocks 23 to slide on clamp rods 139 mounted within the clamp frame 138. The moveable shell 136 is positioned on the clamp rods 139 by a shell drive 140 shown as an air actuated clamp cylinder 46. As the cylinder 46 extends, the moveable shell 136 clamps the pipe against the fixed shell 137. As the cylinder 46 retracts, the moveable shell 136 releases the pressure against the fixed shell 137 to allow removal of the pipe 100.

The fixed shell 137 is constructed from a lower clamp block 45 mounted by left hand lower clamp side block 27 and right hand lower clamp side block 28 inside the clamp frame 138. An end stop 144 is mounted on the fixed shell 137 to control the positioning of the pipe end 102. As may be seen in FIG. 2, the fixed shell 137 also defines a cutting access 146 so that the exit port 118 may be formed in a bell type of pipe end 102. A drill bushing 62 may be used to help steady the drill bit 61.

The clamp depth 132 shown in FIG. 1 is sized to be able to support a bell 98 type of pipe end 102 along the entire length of the groove 108 when an internal cut is needed. When machining the exterior of a male cylindrical 96 type end, the clamp 130 is placed farther away from the machining extension 152 so that the clamp 130 holds the distal or back portion of the pipe 100 so that the end 102 is exposed for machining on the external portion of the pipe 100.

Figure 4:
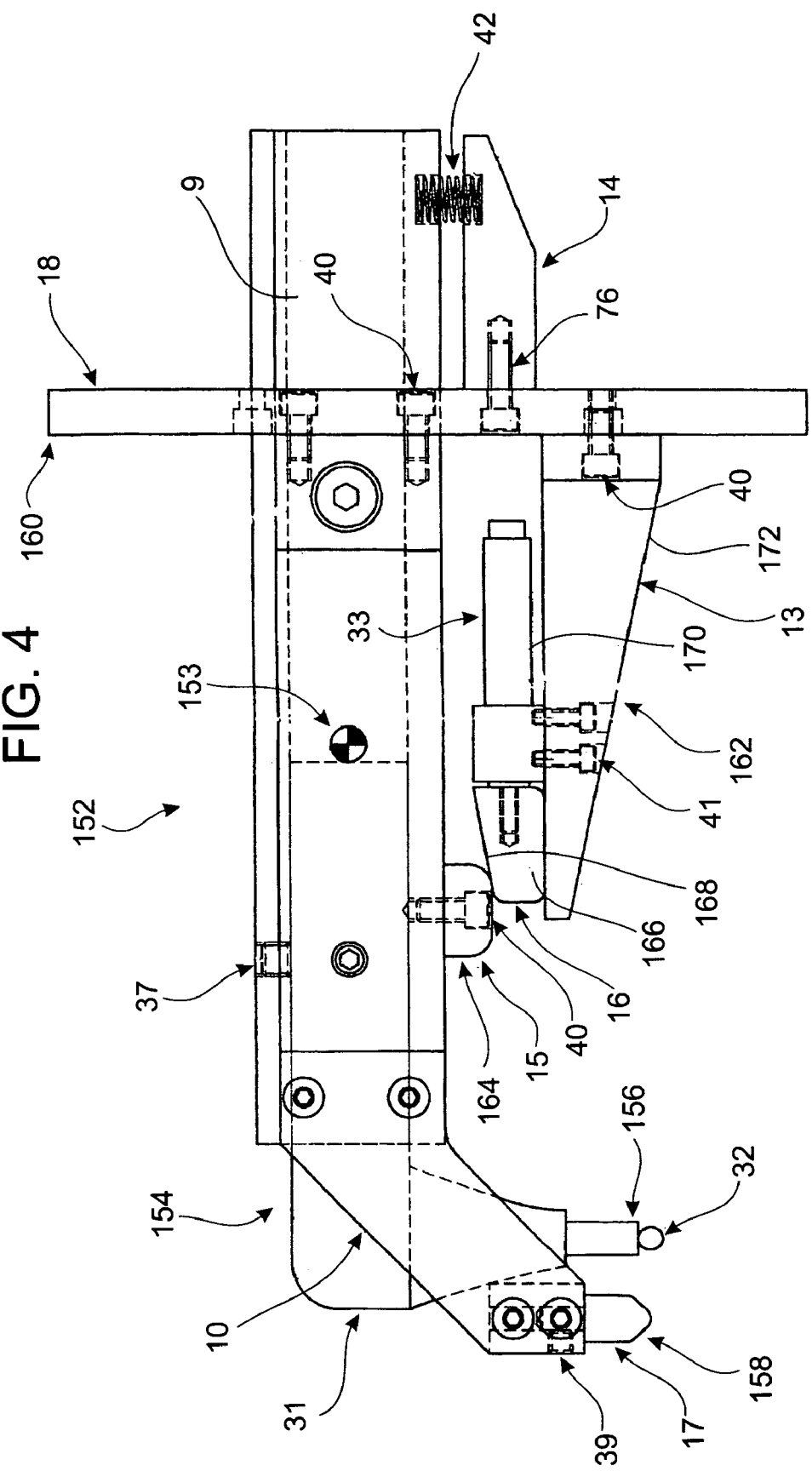
FIG. 4 is a side view of the spiral groove machining assembly.
Figure 5:
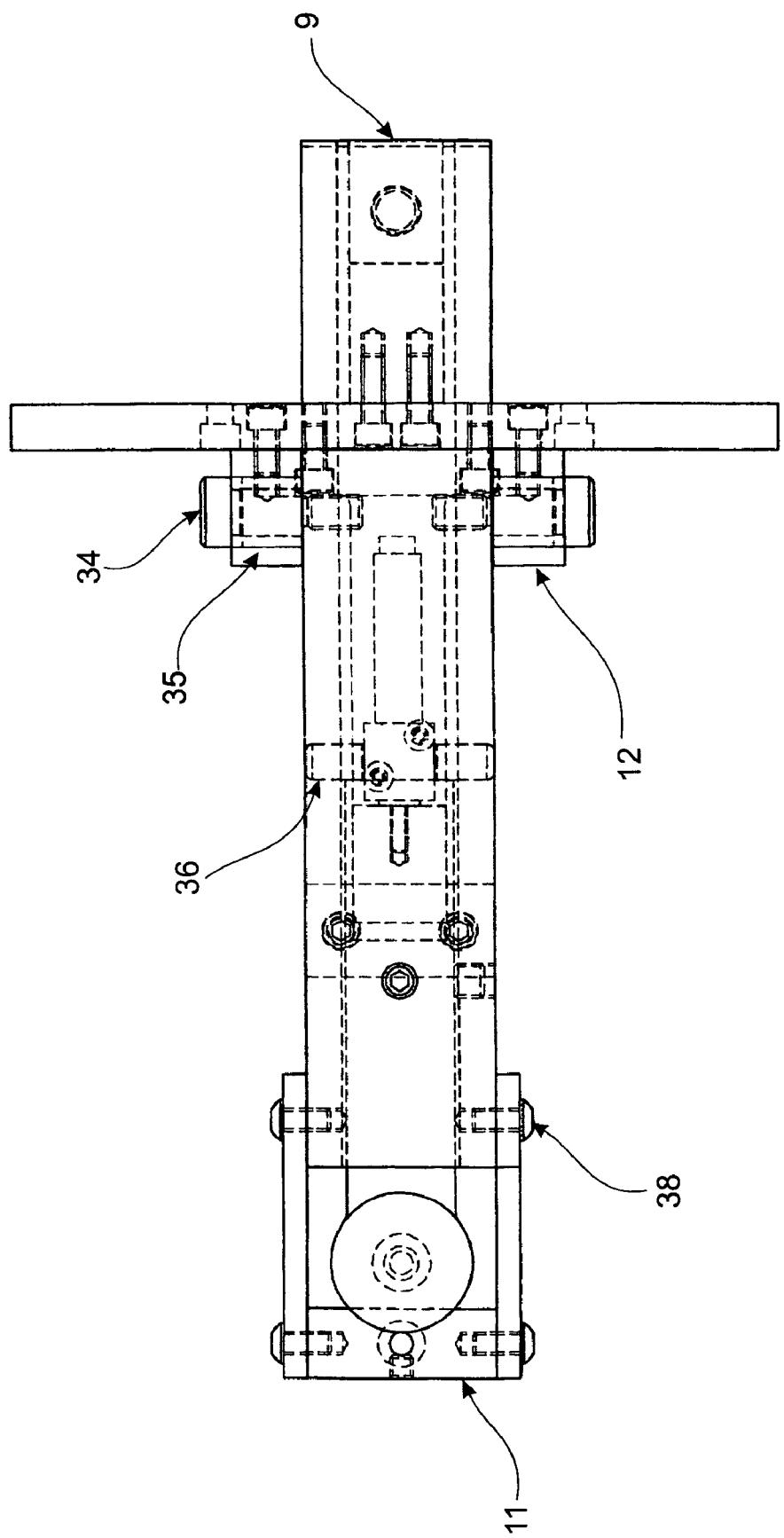
FIG. 5 is a top view of the spiral groove machining assembly.
Figure 6:
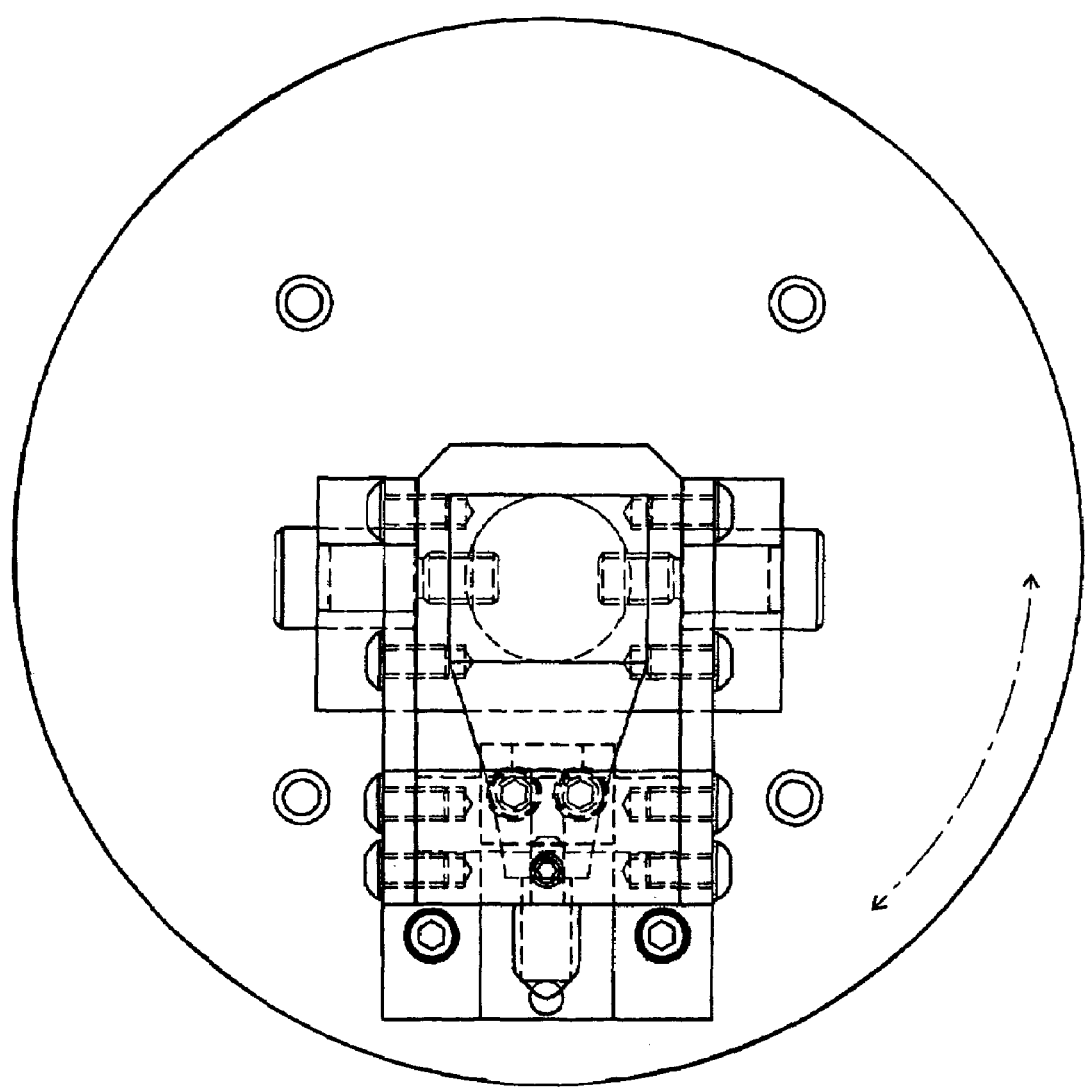
FIG. 6 is a machine head end view of the spiral groove machining assembly.
Figure 7:
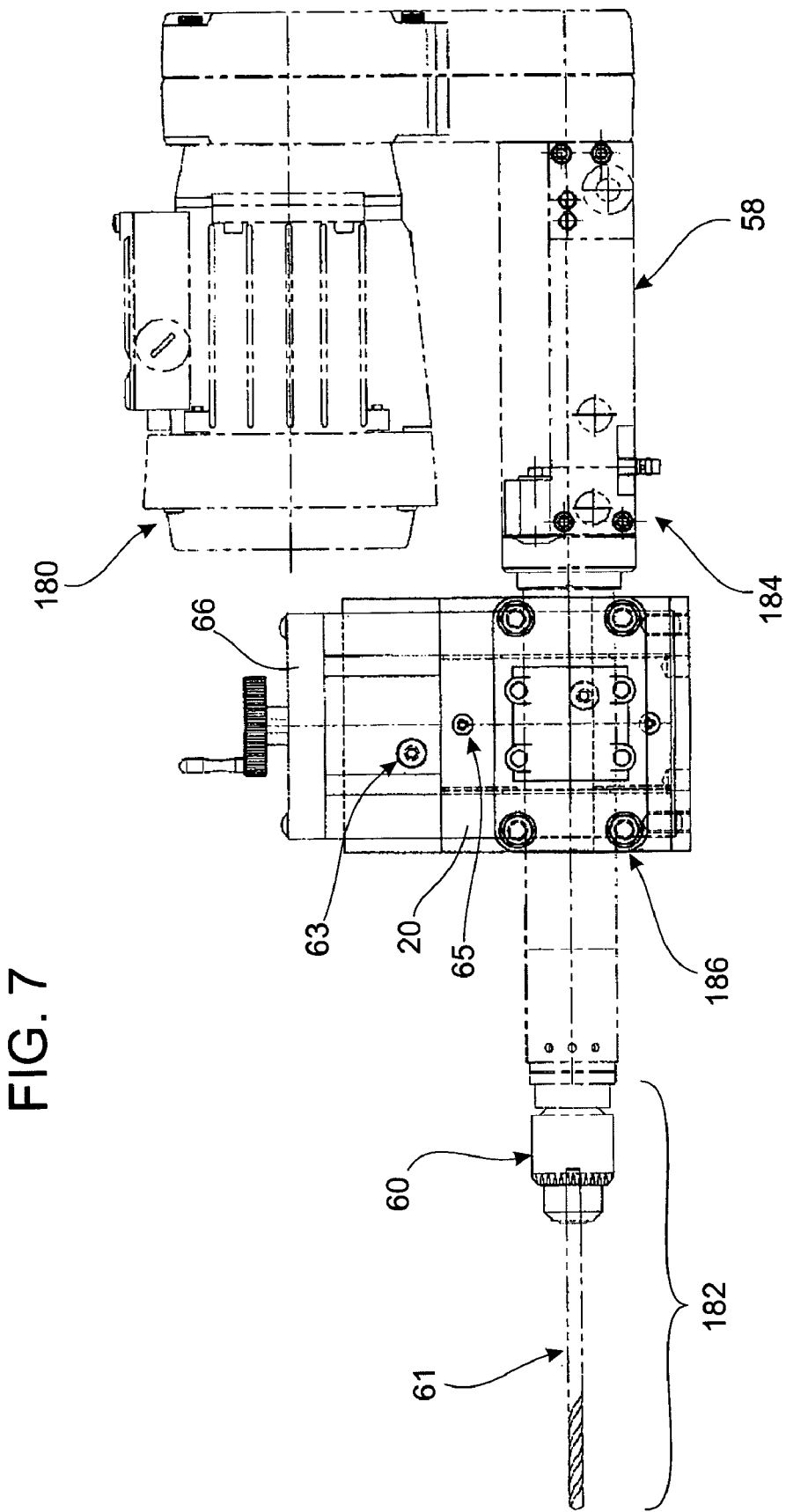
FIG. 7 is a side view of the exit port machining assembly.
Figure 8:
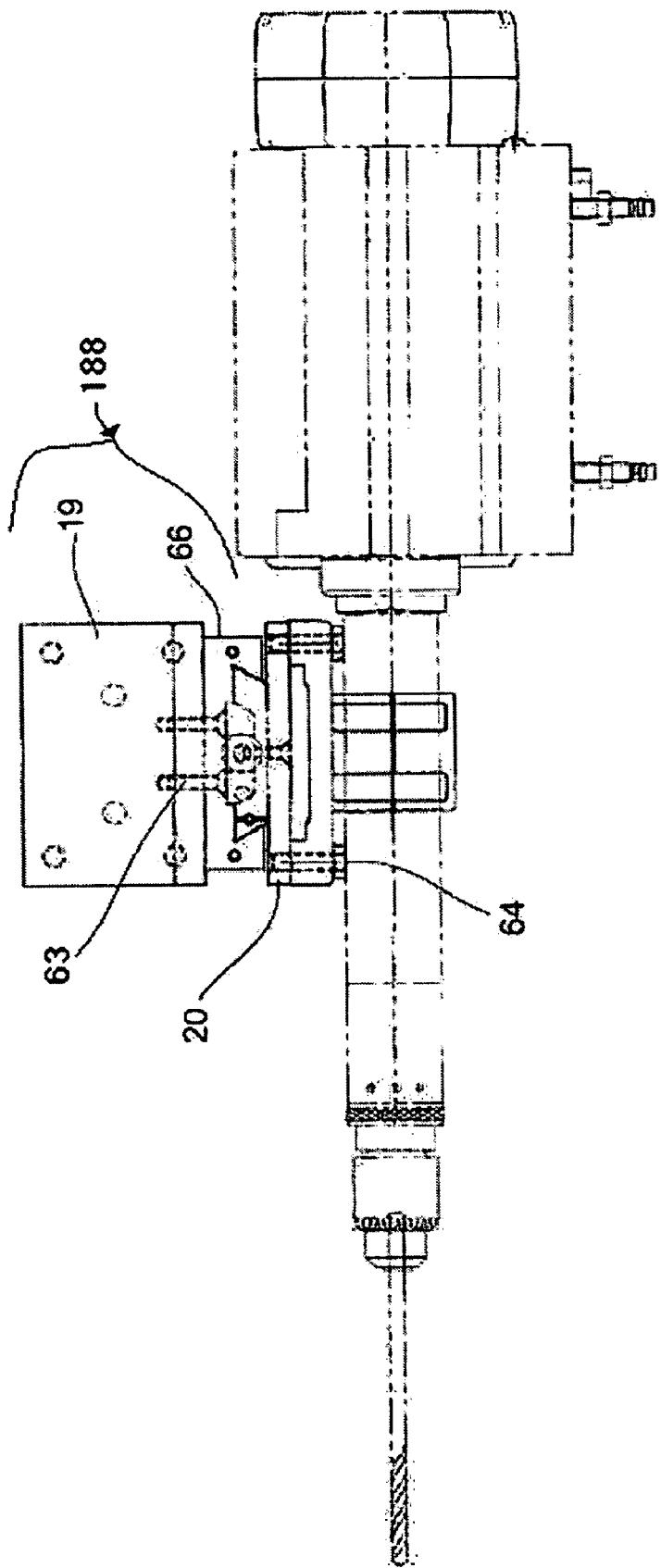
FIG. 8 is a top view of the exit port machining assembly.
Figure 9:
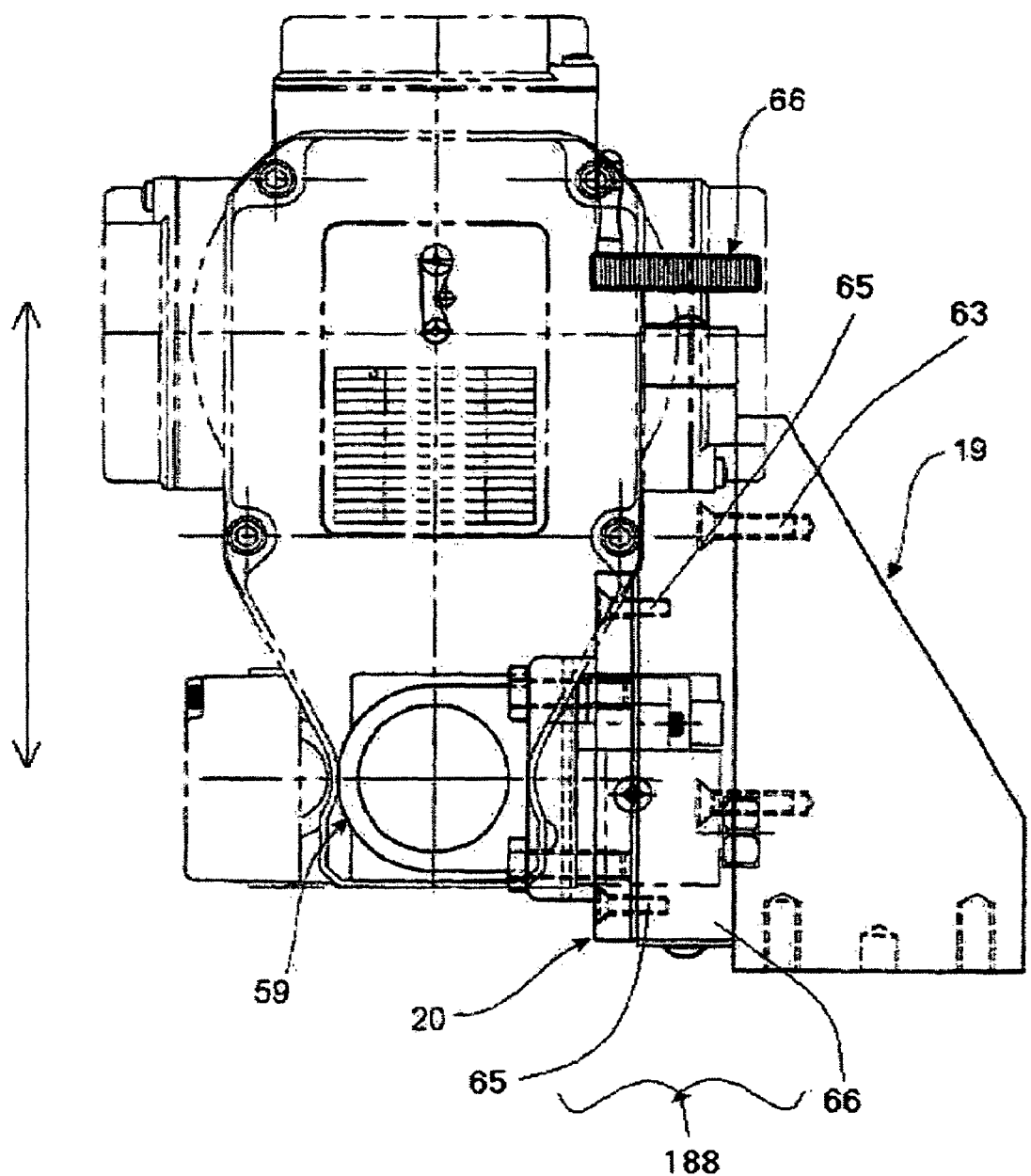
FIG. 9 is a rotational drive end view of the exit port machining assembly.

FIGS. 1 and 3 provide an overview of the spiral groove machining assembly 150 using a machining extension 152 powered and positioned by a rotational linear displacement drive 192. The machining extension should be small enough to cut the groove inside a bell end of a pipe and long enough to cut the recessed groove on the male cylinder pipe end. As seen in FIGS. 4, 5, and 6, the machining extension 152 uses a machining head 154 having a rotational cutter 156 and a surface tracker 158. The machining extension 152 is mounted by socket head cap screw 76 to a rotational assembly base 160 shown as spindle 8 mounted in spindle housing 6 and supported by bearing 72. The rotational assembly base 160 is connected by a dowel pin 75 to the modified lead screw 70 protected by protective bellows 77 secured by hose clamps 78. In this manner, the entire rotational assembly base 160 and all of the connected assemblies rotate and move linearly with the modified lead screw 70. As will be explained in more detail later, the modified lead screw 70 rotates like the bar of a c-clamp inside the fixed position of the ball support housing 7 such that the threads on the lead screw 70 cause the entire rotational assembly base 160 to both rotate and move linearly along the axis 151 of the pipe 100. Thus, the entire rotational assembly base 160 both rotates around the central axis 151 of the pipe 100 and moves linearly along the length of the pipe axis 151 to from the spiral nature of the groove 108.

As best seen in FIG. 4, machining extension 152 is mounted on a pivot system 153 and biased by a spring 42 supported off of the rotational assembly base 160. The machining extension 152 uses a tool holding arm 9 that is mounted to the tool mount plate 18 by dowel pin 36 supported off of tool pivot block 12 using a shoulder screw 34 rotating in a bronze bushing 35. This provides for the necessary reach for cutting the male pipe end groove 108 and also provides a suspension system for the machining extension 152. The tool holding arm 9 is biased by spring 42 which is supported off of spring support block 14. Spring support block 14 is connected to the tool mount plate 18 by socket head cap screw 76.

Machining extension 152 uses a cutter 32 rotated by a right angle die grinder 31. The depth of the cut of the groove 108 in relation to the surface tracker 158 is adjusted by socket set screw 37. Surface tracker 158 includes a tool guide 17 mounted by socket set screw 39 to tool guide mount arm 10 and connected into the machining extension 152 using tool guide mount block 11 with extending arm side plates secured by bolt head cap screws 38.

The entire machining extension 152 is positioned by an adjustable depth positioning extension 162 that controls the position of the machining head 154 and selectively uses the surface tracker 158 for following the surface contours 122 of the pipe end 102. The machining extension 152 may make several passes before achieving the depth of the grooves 108. As noted in FIG. 14, the grooves 108 may be cut in multiple passes such as an initial reduced depth pass 112 and a subsequent full depth pass 114 to cut the groove depth 110. The structure to perform this feat is shown in FIG. 4. Thus, the adjustable depth positioning extension 162 uses a slide base 164 connected to the machining extension 152 shown as a tilt cylinder contact plate 15 mounted by socket head cap screw 40 to tool holder arm 9. This provides a basic contact point for the tool holder arm 9. The slide base 164 is biased by the spring 42 against a varying bias stop 166. The varying bias stop 166 uses an adjustable slide ramp 168 positioned by a linear slide actuator 170 mounted on a slide arm base 172 connected to the rotational assembly base 160. The varying bias stop is proved by the angled form of the tilt cylinder contact block 16 used to move the tilt cylinder contact plate 15. First, a base is provided to push against. This is provided by the tilt cylinder mount block 13 connected to tool mount plate 18 by a socket head cap screw 40. Tilt cylinder 33 is then mounted to the tilt cylinder mount block 13 by socket head cap screw 41 and is used to extend and retract the angled surface of tilt cylinder contact block 16. This provides a linear slide actuator 170 that may be used to extend and retract the angled surface of the tilt cylinder contact block 16. As the linear slide actuator 170 extends, the adjustable slide ramp 168 will cause the machining extension 152 to pivot upward. Similarly, as the linear slide actuator 170 retracts, the adjustable slide ramp 168 will allow the biased machining extension 152 to pivot downward. When this is related to the positioning of the machining extension 152 to the pipe end 102 shown in FIG. 1, one may easily see how the contact of the machining head 154 with the pipe and the depth of the cut may be controlled. If the adjustable slide ramp 168 is sufficiently retracted, the bias of the spring 42 will force the machine head against the pipe end 102 until the surface tracker 158 contacts the surface contour 122 of the pipe end 102. The surface tracker 158 will then follow the surface contour 122 as the entire machining extension 152 and associated adjustable depth positioning extension 162 mounted on the rotational assembly base 160 is rotated and extended by the rotational linear displacement drive 192.

As shown in FIG. 1, bearing 72 is used as a substantive diameter bearing support 174 to support the rotational assembly base 160 inside the ball nut housing 7. This substantive diameter bearing support 174 has a diameter approximating that of the pipe end 102 being machined. This substantive diameter minimizes the effect of bearing play or tolerance within the support 174 to reduce tool chatter and improve the quality of the cut for the groove 108.

FIGS. 1 and 3 provide clear views of the operation of the rotational linear displacement drive 192. This operates very similarly to the moveable clamping pad in a c-clamp acting against the fixed bearing of the clamp. As the shaft is rotated, the threads on the shaft and the fixed position of the bearing cause a linear movement of the shaft.

The rotational linear displacement drive 192 uses a rotational movement source 194 including a rotational motor 196, shown as electric motor 68, connected to a reduction gear box 200 by hex head cap screws 50. The motor 196 and the gear box 200 are mounted on a slide bearing 198. The electric motor 68 is mounted using a hex head cap screw 73 to a gear box slide plate 3. The gear box slide plate 3 is held in position by the slide plate retainer 4 secured to the base plate 1 by socket head cap screw 57. The gear box slide plate 3 rides on replaceable wear strips 5 held to the base plate 1 by flat head cap screw 65. This allows the motor and gear box to slide linearly along the pipe axis 151. The reduction gear box 200 is shown as a typical gear reducer 67 and is connected to the rotational-to-linear converter 202 by the threaded shaft 204 formed from a modified lead screw 70.

The rotational-to-linear converter 202 uses a threaded shaft 204 connected to the motor through the shaft coupling 69. The threaded shaft 204 is shown as a modified lead screw 70 passing through a ball nut 7 mounted in a fixed position ball nut support 206 and held in place by hex head cap screw 74. The linear displacement is caused by the threads on the modified lead screw 70 rotating inside the fixed position of the ball nut 7. This would be the base of the c-lamp. Through this connection, the rotational to linear converter 192 controls the linear position of the electric motor 68, linearly fixed to the machine extension 152, using the slide mounting of the rotational motor 196 and gear box 200 to allow linear displacement 208. The rotation is provided by the rotational movement created by the rotational motor 196.

FIGS. 2, 7, 8, and 9 show the exit port machining assembly 178. The exit port machining assembly 178 uses a rotational drive 180 for powering a rotational cutting head 182. The rotational drive 180 is shown as an auto feed drill 58 having a rotational cutting head 182 including a drill chuck 60 operating a drill bit 61. The extension and retraction of the auto feed drill 58 is used as a head displacement drive 184 for the insertion and retraction of the drill bit 61. The amount of insertion is controlled by a groove depth adjustment device 186. Basically, the maximum extension of the drill 58 is adjusted to the achieve the proper depth. The drill is then clamped in position using the drill clamp 59. This provides the groove depth adjustment device 186 for controlling the depth of the insertion.

The drill clamp 59 is supported by hex head cap screw 64 connected to the diameter adjustment device 188. The diameter adjustment device 188 allows for vertical adjustment of the position of the auto feed drill 58 for different diameters of pipes 100 and variations in the clamping setup. Vertical adjustment is performed using an adjuster slide 66 connected by a flat head cap screw 63 to a drill unit adjuster mount 19 attached to the base plate 1. The adjuster slide 66 uses a handle on a threaded rod to adjust the vertical position of the clamp adaptor plate 20. The threaded rod and the dovetail shape of the adjuster slide 66 is easily seen in FIG. 8. The clamp adaptor plate 20 of the adjuster slide 66 is connected to the drill clamp 59 through the flat head cap screw 65.

The following list details reference numbers used in the drawings:

base plate 1
base plate frame weldment 2
gear box slide plate 3
slide plate retainer 4
wear strip 5
spindle housing 6
ball nut housing 7
spindle 8
tool holding arm 9
tool guide mount arm 10
tool guide mount block 11
tool pivot block 12
tilt cylinder mount block 13
spring support block 14
tilt cylinder contact plate 15
tilt cylinder contact block 16
tool guide 17
tool mount plate 18
drill unit adjuster mount 19
drill unit clamp adaptor plate 20
clamp frame top plate 21
upper clamp plate 22
upper clamp side block 23
pipe stop 24
clamp block stop 25
clamp lock 26
left hand lower clamp side block 27
right hand lower clamp side block 28
left hand clamp frame side plate 29
right hand clamp frame side plate 30
die grinder 31
cutter 32
tilt cylinder 33
shoulder screw 34
bronze bushing 35
dowel pin 36
socket set screw 37
bolt head cap screw 38
socket set screw 39
socket head cap screw 40
socket head cap screw 41
spring 42
clamp frame lower plate 43
upper clamp block 44
lower clamp block 45
clamp cylinder 46
bearing 47
bearing shaft 48
bolt head cap screw 49
hex head cap screw 50
bolt head cap screw 51
dowel pin 52
socket head cap screw 53
dowel pin 54
bolt head cap screw 55
dowel pin 56
socket head cap screw 57
auto feed drill 58
drill clamp 59
drill chuck 60
drill bit 61
drill bushing 62
flat head cap screw 63
hex head cap screw 64
flat head cap screw 65 adjuster slide 66
gear reducer 67
drive motor 68
shaft coupling 69
modified lead screw 70
ball nut 71
bearing 72
hex head cap screw 73
hex head cap screw 74
dowel pin 75
socket head cap screw 76
protective bellows 77
hose clamp 78
spline 92
joint gasket 94
bell 96
male cylinder 98
a plastic pipe 100
an end 102
spiral spline pipe joint 103
an external diameter 104
an internal diameter 106
a spiral spline groove 108
a groove depth 110
an initial reduced depth pass 112
a subsequent full depth pass 114
a distance 116
an exit port 118
a port depth 120
surface contours 122
A spiral spline pipe groove forming apparatus 126
a base 128
a releasable pipe clamp 130
a clamp depth 132
a clamp jaw 134
a movable shell 136
a fixed shell 137
a clamp frame 138
clamp rods 139
a shell drive 140
cross over plates 141
a jaw interchange assembly 142
L-shaped shoulders 143
an end stop 144
a cutting access 146
a spiral groove machining assembly 150
a pipe axis 151
a machining extension 152
a pivot 153
a machining head 154
a rotational cutter 156
surface tracker 158
a rotational assembly base 160
an adjustable depth positioning extension 162
a slide base 164
a varying bias stop 166
an adjustable slide ramp 168
a linear slide actuator mounted 170
a slide arm base 172
an substantive diameter bearing support 174
an exit port machining assembly 178
a rotational drive 180
a rotational cutting head 182
a head displacement drive 184
a groove depth adjustment device 186
a diameter adjustment device 188
a rotational linear displacement drive 192
a rotational movement source 194
a rotational motor 196
slide bearing 198
a reduction gear box 200
a rotational-to-linear converter 202
a threaded shaft 204
a ball nut support 206
linear displacement 208

From the foregoing, it will be seen that this invention is well adapted to obtain all the ends and objects herein set forth, together with other advantages which are inherent to the structure. It will also be understood that certain features and subcombinations are of utility and may be employed without reference to other features and subcombinations. This is contemplated by and is within the scope of the claims. Many possible embodiments may be made of the invention without departing from the scope thereof. Therefore, it is to be understood that all matter herein set forth or shown in the accompanying drawings is to be interpreted as illustrative and not in a limiting sense.

What is claimed is:

1. A spiral spline pipe groove forming apparatus for machining an end of a pipe having an external diameter and an internal diameter, the apparatus comprising:
   a base;
   a releasable pipe clamp for fixably positioning the end of the pipe, the releasable pipe clamp supported by the base;
   a spiral groove machining assembly supported by the base and actuated by a rotational motor with linear movement proportional to rotational movement to form a spiral spline groove into internal diameter of the end of the clamped pipe; and,
   an exit port machining assembly supported by the base and having a rotational drive powering a rotational cutting head configured to form an exit port extending from the spiral groove.

2. The apparatus of claim 1, further comprising:
   a cutting access defined by the releasable pipe clamp, wherein the exit port machining assembly is aligned to form the exit port through the cutting access.

3. The apparatus of claim 1, the exit port machining assembly further comprising:
   a head displacement drive for selectively positioning the rotational cutting head.

4. The apparatus of claim 3, the head displacement drive further comprising:
   an adjustable depth stop to control a port depth of the exit port extending from the spiral groove.

5. The apparatus of claim 3, the exit port machining assembly further comprising:
   a diameter adjustment device adapted to align the rotational cutting head with the spiral spline groove.

6. The apparatus of claim 3, wherein the rotational cutting head is aligned to form an exit port tangent to the spiral spline groove.

7. The apparatus of claim 1, said machining assembly including a machining extension with a rotational cutter and a surface tracker.

* * * * *